United States Patent [19]

Borm et al.

[11] Patent Number: 5,239,535
[45] Date of Patent: Aug. 24, 1993

[54] ARRANGEMENT FOR TESTING THE TRANSMISSION PROPERTIES OF SUBSCRIBER LINE MODULES OR DIGITAL TERMINAL EQUIPMENT OF A COMMUNICATION SYSTEM CONNECTIBLE THERETO

[75] Inventors: Winfried Borm; Detlef von Reusner, both of Munich, Fed. Rep. of Germany

[73] Assignee: Siemens Aktiengesellschaft, Munich

[21] Appl. No.: 803,726

[22] Filed: Dec. 9, 1991

Related U.S. Application Data

[63] Continuation of Ser. No. 527,276, May 22, 1990, abandoned.

[30] Foreign Application Priority Data

May 23, 1989 [DE] Fed. Rep. of Germany ....... 3916772

[51] Int. Cl.⁵ .......................... H04J 3/14; H04B 17/00
[52] U.S. Cl. ......................................... 370/13; 370/15; 370/17; 371/20.5

[56] References Cited

U.S. PATENT DOCUMENTS

| 3,956,601 | 5/1976 | Harris et al. | 371/20.4 |
| 4,611,320 | 9/1986 | Southard | 370/13 |
| 4,730,313 | 3/1988 | Stephenson et al. | 371/20.5 |
| 4,916,411 | 4/1990 | Lymer | 375/10 |

FOREIGN PATENT DOCUMENTS

| 3137314 | 3/1984 | Fed. Rep. of Germany . |
| 3235870 | 3/1984 | Fed. Rep. of Germany | 379/5 |

Primary Examiner—Douglas W. Olms
Assistant Examiner—H. Kizou
Attorney, Agent, or Firm—Hill, Steadman & Simpson

[57] ABSTRACT

Test pulses representing bits combined in bursts are generated, defined in form and amplitude, and jittered, defined by reading curve shaped characteristic data and jitter identification data from digital memories, for the purpose of simulating defined cable types and lengths and are transmitted to a unit to be tested. In a receiver, the test pulse is received and forwarded by the unit under test are accepted for the purpose of a test and are compared to the test pulses transmitted by the transmitter.

18 Claims, 2 Drawing Sheets

5,239,535

ARRANGEMENT FOR TESTING THE TRANSMISSION PROPERTIES OF SUBSCRIBER LINE MODULES OR DIGITAL TERMINAL EQUIPMENT OF A COMMUNICATION SYSTEM CONNECTIBLE THERETO

This is a continuation of U.S. patent application Ser. No. 527,276, filed May 22, 1990 now abandoned.

BACKGROUND OF THE INVENTION

1. Field of the Invention

The present invention relates to an arrangement for testing the transmission properties of subscriber line modules and of digital terminals of a communication system connectible thereto, and in which there is a selection control for the initialization of the respective subscriber line modules and for the connection of the individual subscriber interfaces thereof, as well as of individual terminals to a testing device.

2. Description of the Prior Art

In addition to analog telephone terminals, more and more digital telephone terminals or terminals designed for digital communication are being increasingly connected to contemporary digital communication systems. The connection of digital terminals occurs via subscriber line modules that form the periphery of the actual communication system, the jobs and operations of the subscriber line modules usually corresponding to internationally-standardized agreements. These declared standards thereby usually refer to interfaces of specific terminals with a communication system, whereby, in practice, subscriber line modules contain a multitude of such interfaces. For example, it is known to utilize a subscriber line module SLMB (Subscriber Line Module Burst System) for the connection of digital terminals that operate in a burst mode to the connection unit of a communication system, whereby this subscriber line module accepts eight of what are referred to as U200 interfaces. The information from and to the terminal are thereby transmitted according to the time separation transmission mode via a respective two-wire line in a 20 bit burst mode. The bit rate per direction amounts to 80 Kbit/s and is composed of a 64 Kbit/s voice channel and of, respectively, 8 Kbit/s for signalling and synchronization. The subscriber line module converts the exchange-side information of two pulsed-code modulation (PCM) channels from a switching matrix array of a communication system and from a High Level Data Link Control (HDLC) to the burst mode and vice-versa. A rate matching between the transmission clock and a processing clock occurs in each of the U200 interfaces, as do the four-lead, transparent conversion of the 64 Kbit/s useful channel information between the subscriber line module and the subscriber line, and, as well, the coding, overlaying or, respectively, taking and decoding of the operations signalling at the B-channel of a digital transmission. Further jobs assumed by the U200 interface are the compilation and separation of the burst information, the frame monitoring, the status control of the transmitter and time control of the adaptive receiver.

Subscriber line modules SLMD that, for example, contain four interfaces referred to U$_{PO}$ according to a CCITT recommendation service for the connection of ISDN terminals to digital communication systems; two-wire interfaces are thereby involved that operate according to the burst mode. Each of the four central office lines offers two B-channels having 64 Kbit/s for the message transmission and a D-channel having 16 Kbit/s for the transmission of signalling information. Here, also, the interfaces assume many-sided jobs whereof the formation of the frame structure, the encoding of the transmission data, the transmission with a transmission clock derived from the system clock, the echo compensation and the separation of the D-channel and the B-channel bit streams are referenced.

The transmission-oriented testing of the digital interfaces or, respectively, of the digital subscriber line modules, i.e. the testing of all relevant physical parameters of these interfaces, is not so satisfactorily possible, particularly in view of the multitude of transmission-oriented parameters that must be checked, that an automatic measuring or testing would be possible within the framework of the production of communication systems.

SUMMARY OF THE INVENTION

The object of the present invention, therefor, is to provide an arrangement in which both such subscriber line modules, as well as the digital terminals connectible thereto can be tested in view of their transmission characteristics with a flexibility in the setting of the properties of the information transmitters and the types and lengths of the cables employed that enables utilization in practice.

The above object is achieved, according to the present invention, in an arrangement for testing the transmission characteristics of subscriber line modules and of digital terminals of a communication system connectible thereto, which comprises a selection control device for the initialization of, respectively, one of the subscriber line modules and a further connection of individual subscriber interfaces thereof, as well as of individual terminals to a testing device, comprising a transmission device for generating test pulses, that represents bits combined into bursts and are fashioned defined in shape and amplitude and are jittered defined for the purpose of simulating specific cable types and lengths thereof by reading out characteristic curve-shaped data and jitter by identification data from digital memories, as well as digital-to-analog conversion of the read-out data, comprising a receiving device for the acceptance of the test pulses received by the unit being tested and sent out again in the course of a processing event acting in the sense of a test loop, in which the receiving characteristics of a digital terminal can be set when testing a subscriber line module and the receiving properties of a subscriber line module can be set when testing a terminal, comprising an evaluation device for the comparison of the test pulses transmitted by the transmission device to the test pulses received by the receiving device, comprising a switching equipment for coupling the transmission device and the receiving device to the line interface of the respective unit under test, and comprising a central microcomputer for the coordination of the transmission device, the receiving device, the evaluation device and the selection control device.

The critical features of the arrangement of the present invention may be seen in that the forwarding of the information from the digital terminal to a subscriber line module or in the opposite direction is digitally simulated, whereby the influencing of the test pulses by the transmission characteristics of different cables is also involved in the measurement on the basis of digital simulation of the cable characteristics. A further matching of the test conditions to real transmission characteristics occurs by digital generation of a jitter that is programmable in jitter frequency, jitter boost and jitter curve shapes.

The number of bit errors serve as a criterion for evaluating the transmission characteristics in the receiving the direction. These bit errors are identified by comparing the transmitted test pulses to received test pulses. It has proven to be of importance in for practice that the test pulses are designed such that the receiver is operated at the limit of its possibilities for discriminating pulses. Statements about the receiving characteristics thereby become possible on the basis of relatively brief-term measurements. The aim in practice is that the bit error rate, i.e. the number of faulty interpreted bits related to the overall number of transmitted bits, lies in a region for which short measurements suffice. Meaningful bit error rates of this type lie at approximately 0.001–0.01. In order to create such bit error rates, the transmission signal, test pulses used in the arrangement of the present invention, is "deteriorated" until such bit error rates appear. Proceeding on the basis of the data obtained, conclusions can then be drawn concerning the bit error rates to be anticipated in the real operating case and the quality of the unit under test can be subsequently evaluated. The empirical values for such a calculation are acquired by comparison to traditional bit error rate measurements of real cables; theoretical calculations and estimates can also be utilized in this context.

The test methods employed assume that the signals coming from the unit under test can be faultlessly interpreted by the receiving device. Accordingly, optimum transmission characteristics are created for this transmission direction, i.e. optimally-short cables are employed and the transmitter unit under test is terminated with a specified impedance. In accordance with an advantageous feature of the invention, a sampling device serving the purpose of acquiring the transmission signals of the unit under test is connected to the line interface of the respective unit under test for evaluating the transmission characteristics, this sampling device comprising a memory for storing the sampled signal values of at least one burst cycle. The following parameters can be identified with the assistance of the stored signal values:

(a) input and output impedance;

(b) pulse shape;

(c) pulse symmetry;

d) symmetry to ground; and (e) jitter of the transmission signal.

Further advantageous features and developments of the invention are directed to the transmission device that constitutes a critical component thereof and with which the simulation of an analog pulse transmitter as well as the simulation of a real subscriber cable are undertaken. All occurring cable types and cable lengths, as well as pulse shapes and pulse amplitudes, are, therefore, set with the transmission device in a scope of variation adequate for the demands of practice. For testing a U200 interface, for example, cosine-square pulses having a pulse repetition rate of 256 KHz must be capable of being generated; square-wave pulses at 384 KHz must be generated for testing a $U_{PO}$ interface. A further critical job of the transmission device is the defined jittering of the output signal.

For generating such a jitter defined in view of the critical identification data, an advantageous feature and development of the invention provides that strings of numerical values that define a jitter of the read-out clock for the individual bits of a burst in terms of jitter frequency, jitter height and jitter characteristics are stored in a digital memory, a jitter memory, that accepts the jitter identification data and that is constructed as a write-read memory.

In the transmission of the digital information with the transmission rates provided therefor, certain cable types or, respectively, greater length thereof that occur in practice lead to a considerable chronological expansion of the pulses received at the end of a transmission link in comparison to a pulse width of the pulses transmitted at the start of the length. A matching to these conditions is advantageously achieved in that the transmission device comprises a plurality of curve shape memories corresponding in number to a prescribed, maximum plurality of chronologically-overlapping pulses, a respective curve shape being represented in each of these curve shape memories on the basis of a prescribed number of data words. Eight such curve shape memories prove adequate in practice, whereby each test pulse in each of, for example, 128 sampling steps is composed by the data words of eight curve shape memories. This preferably occurs such that outputs of the curve shape memories are fed in parallel to inputs of an adder module. The respective test pulse to be output onto the subscriber line is generated in that an output of the adder module is connected to a digital-to-analog converter whose output is connected to the input of a low-pass filter connected to a subscriber line.

A further matching to the multitude of pulse shapes required for practice is achieved in that each curve shape memory comprises at least three memory areas wherein the curve shape of a positive pulse, of a negative pulse and of a zero pulse are stored. In view of the lower time requirement for the formation of the test pulses, this solution is to be preferred to another solution that is more beneficial in view of the memory requirements in accordance wherewith the data words stored for a positive pulse would be inverted for the formation of a negative test pulse.

As set forth above, the chronological spacing between the pulses is determined by the content of the jitter memory. Jitter-infested signals can be generated by writing different values for the spacing into the jitter memory. The smallest step by which a pulse can chronologically deviate from the position given constant pulse repetition rate is prescribed by the sampling frequency and, for example, amounts to 244 ns given 4096 KHz. This sampling pattern, rough jitter, is viewed as being too large, smaller steps can also be achieved by a further advantageous feature and development of the invention in that n identical curve shapes that are chronologically offset relative to one another by $1/(n \times a)$, (where a is the frequency of the read-out clock) are stored in each curve shape memory.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
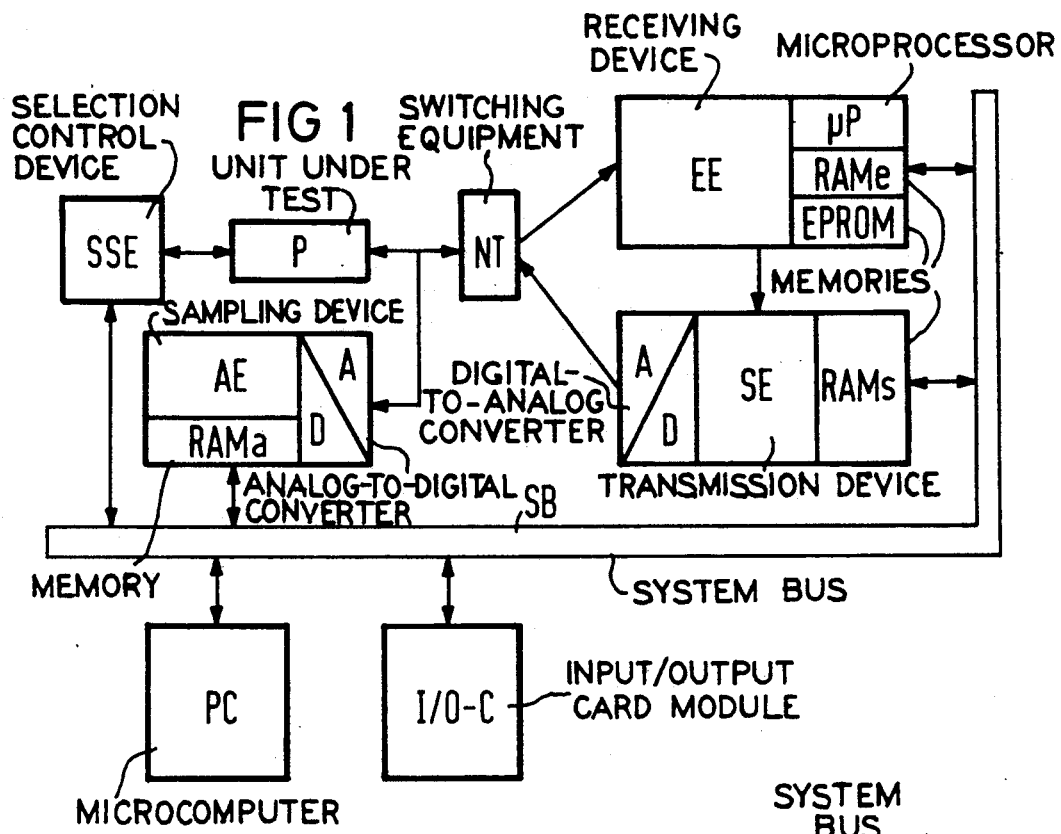
FIG. 1 is a schematic block diagram of the structure and of the critical components of an arrangement for testing the transmission properties of subscriber line modules and of digital terminals connectible thereto.

The control of the measurement and testing operations in the illustrated structure of FIG. 1 for testing the transmission characteristics of subscriber line modules includes, for example, an input/output card I/O-C, modules of the actual test arrangement being connectible. In addition, a microcomputer PC serves for communication with the users of the test arrangement.

A higher-ranking, critical component of the illustrated test arrangement is a selection control device SSE that serves for the initialization of subscriber line modules within a communication system to be tested and serves for coupling subscriber interfaces under test to the actual test device. This is symbolized by the in-flow arrows between the selection control device SSE and a unit P under test that can represent both a subscriber line module as well as a transmission and receiving interface of a digital terminal.

A switching equipment NT forms the actual interface between the subscriber terminal or, respectively, terminal under test P and a receiving device EE or, respectively, a transmitting device SE as further, critical components of the test arrangement. When the unit P under test, for example, is the transmission and receiving interface of a terminal, then the overall test arrangement assumes the fundamental functions cf the switching controller of a communication system and the feed voltage is coupled in at the switching equipment NT. When, by contrast, the unit P under test is a subscriber line module, then the entire test arrangement is connected such that it assumes the fundamental functions of a terminal and the feed voltage is coupled out at the switching equipment NT.

In addition, the switching equipment NT has jobs similar to those of a hybrid set, i.e. that test pulses output by the transmission device SE are transmitted to the unit P under test and the pulses, in turn, output by the unit P under test for the purpose of forming a test loop, are transmitted to the receiving device EE for evaluation.

A further component of the test arrangement is a sampling device AE with which the transmission signals of the unit P under test to the switching equipment NT are sampled and are stored in a memory RAMa after analog-to-digital conversion in a converter A/D. The microcomputer PC that controls the test arrangement starts the process of sampling and can access the stored signal values in a reading fashion. Relevant parameters of the transmission characteristics of the unit P under test can be identified with the assistance of the stored signal values, whereby three burst cycles are preferably stored. Therefore, for example, the input and output impedance of the unit P under test can be calculated from the sampled voltage values and the known input impedance of the sampling device AE can be calculated. The pulse shape and the pulse symmetry can, likewise, be evaluated in the microcomputer PC on the basis of sampling and suitable interpretation. To that end, the line pulses coming from the transmitter of the unit P under test are compared to stored tolerance strategies.

Regardless of the type of interface, for example a U200 or $U_{PO}$, that is being tested, the receiving device just fundamentally exercise the following functions. It assumes the fundamental functions of a subscriber line module or of the interface circuit of a digital terminal. The reception of the signals of the unit P under test forwarded onto the line is included in these functions. Since the digital line simulation is present only in the direction leading to the unit P under test, the receiving device can be constructed in a traditional manner with analog, standard receiving modules.

Since the testing of the transmission properties is based on the measurement of bit error rates, the controlling microcomputer PC forwards transmission data via a system bus SB to the receiving device EE that communicates these data to the transmitting device SE. Since a test loop is established in the unit P under test, the data received by the unit P under test are returned to the receiving device EE via the switching equipment NT. The comparison of the received data to the data originally transmitted that is necessary for calculating the bit error rate can occur either block-by-block with the microprocessor $\mu P$ provided in the receiving device EE or with the controlling microcomputer PC that reads the data from a memory RAMe of the receiving device EE.

The control of the transfer of transmission data to the transmitting device SE as well as the overall control of the receiving device module occurs with the assistance of the microprocessor $\mu P$ to which a further memory EPROM for the acceptance of firmware is allocated in addition to the memory RAMe.

Figure 2:
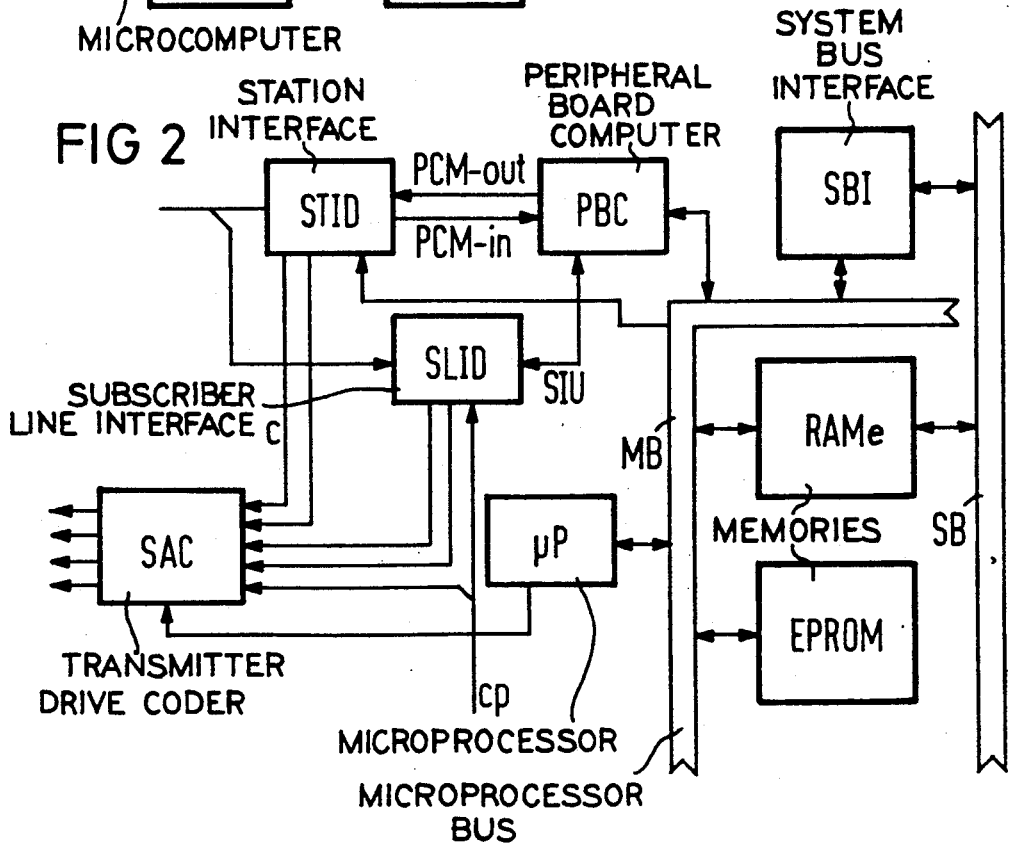
FIG. 2 is a schematic block diagram of a receiving device contained in FIG. 1 for testing a U200 interface.

FIG. 2 illustrates the structure and the fundamental operation of a receiving device for testing a U200 interface. In addition to the structural components already indicated in FIG. I, the critical components of the receiving device are the U200 transmitting/receiving control modules STID (Station Interface Digital) and SLID (Subscriber Line Interface Digital), as well as the peripheral board computer PBC that ranks hierarchically higher over the two control modules of the STID, SLID pair. The central microcomputer PC (not shown in FIG. 2 can access the memory RAMe directly via the system bus SB and via a system bus interface SBI. An indirect coupling to a microprocessor bus MB occurs with the assistance of the memory RAMe.

When the unit under test is a subscriber line module, then the transmitting/receiving control module (Station Interface) is activated, this offering only the possibility at its processor interface of checking the D-channel data; this occurs via a direction connection of the transmitting/receiving control module STID to the microprocessor bus MB. The B-channel data, by contrast, must be processed via a PCM highway (PCM-out, PCM-in), this occurring via the peripheral board computer PBC.

When the unit under test is the interface circuit of a digital terminal, then the transmitting/receiving control module SLID (Subscriber Line Interface) is activated; all transmission and reception data in this operating instance are forwarded from the microprocessor $\mu P$ via the microprocessor bus MB to the peripheral board computer PBC and are transmitted from the latter to the transmitting/receiving control module SLID via a serial bi-directional interface SIU.

A transmitter drive coder SAC serves the purpose of generating input control signals for the transmission device SE (see FIG. 1). Dependent on the operating mode, either a control signal of the transmitting/receiving control module STID and the line-synchronous clock c (256 KHz) or signals of the receiving control module SLID and a central working clock cp (2048 KHz) are employed. The initialization and control of the transmitter drive coder SAC occurs with the microprocessor $\mu P$.

Figure 3:
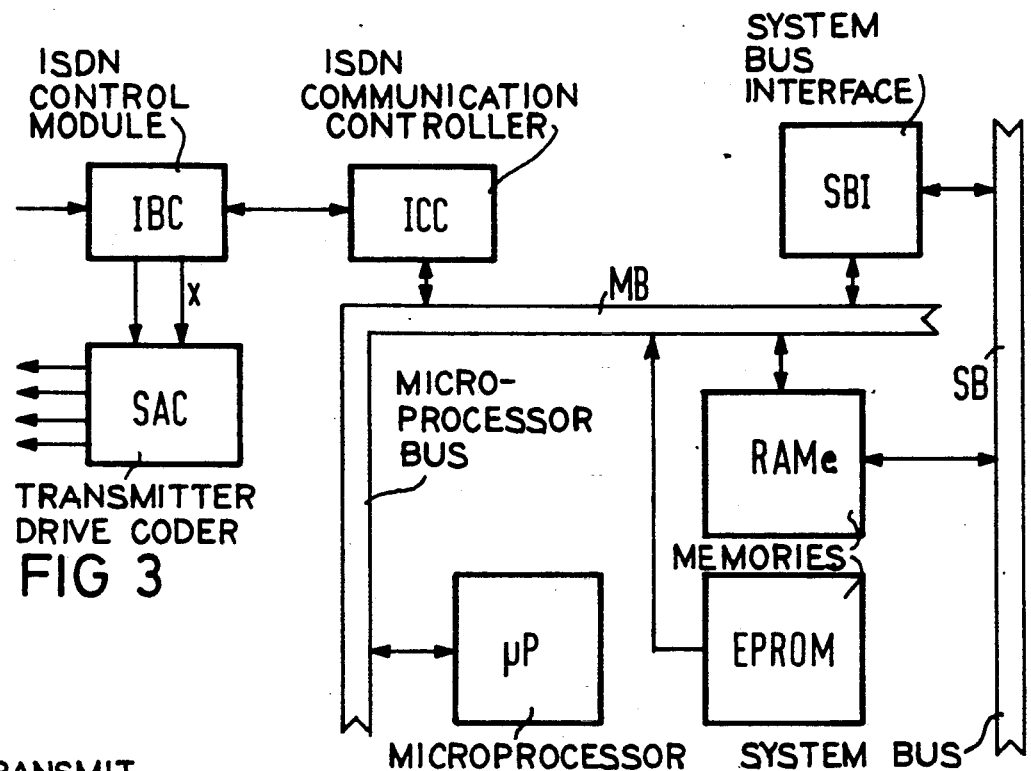
FIG. 3 is a schematic block circuit diagram of the receiving device contained in FIG. 1 for testing a $U_{PO}$ interface.

Substantial parts of the operation of the receiving device (EE, FIG. 1) shown in FIG. 3 are the same as the receiving device shown in FIG. 2. The microprocessor $\mu P$, the two memories RAMe and EPROM are again connected to the microprocessor bus MB by way of which the connection to the central, controlling microcomputer PC (FIG. 1) that is not shown in FIG. 3, occurs with the memory RAMe and with the system bus interface SBI, the central, controlling microcomputer PC, moreover, having a direct access to the memory RAMe via the system bus SB.

The differences compared to the receiving device of FIG. 2 essentially result on the basis of the different type of receiving modules employed, these being adapted to the $U_{PO}$ interface under test. An ISDN control module IBC (ISDN burst controller) that can be a component both of a subscriber line module and of an interface circuit of an ISDN terminal is employed as a transmitting and receiving module. Both the B-channels and the D-channel of an ISDN transmission can be checked at the microprocessor interface of a further control module ICC (ISDN communication controller). The transmitter drive coder SAC is controlled in a similar manner by a control signal and by a line-synchronous clock $\times (1.536$ MHz). The four output lines of the transmitter drive coder SAC carry the same types of control instructions for the transmitter device (FIG. 1) as the output lines of the transmitter drive coder SAC of FIG. 2. A signal on the first line denotes that a positive pulse is to be sent. A signal on the second line denotes that a negative pulse is to be sent. When signals are not present on either of these lines, this denotes that no pulse is to be transmitted (AMI code).

A line data clock is transmitted on the third control line. The signals on the first two lines are interpreted with each positive edge of the clock pulses (the clock amounts to 256 KHz for the U200 interface and amounts to 384 KHz for the $U_{PO}$ interface.

A burst start pulse that marks the beginning of a burst (20 bits for the U200 interface and 38 bits for the $U_{PO}$ interface) is transmitted on the fourth line.

Figure 4:
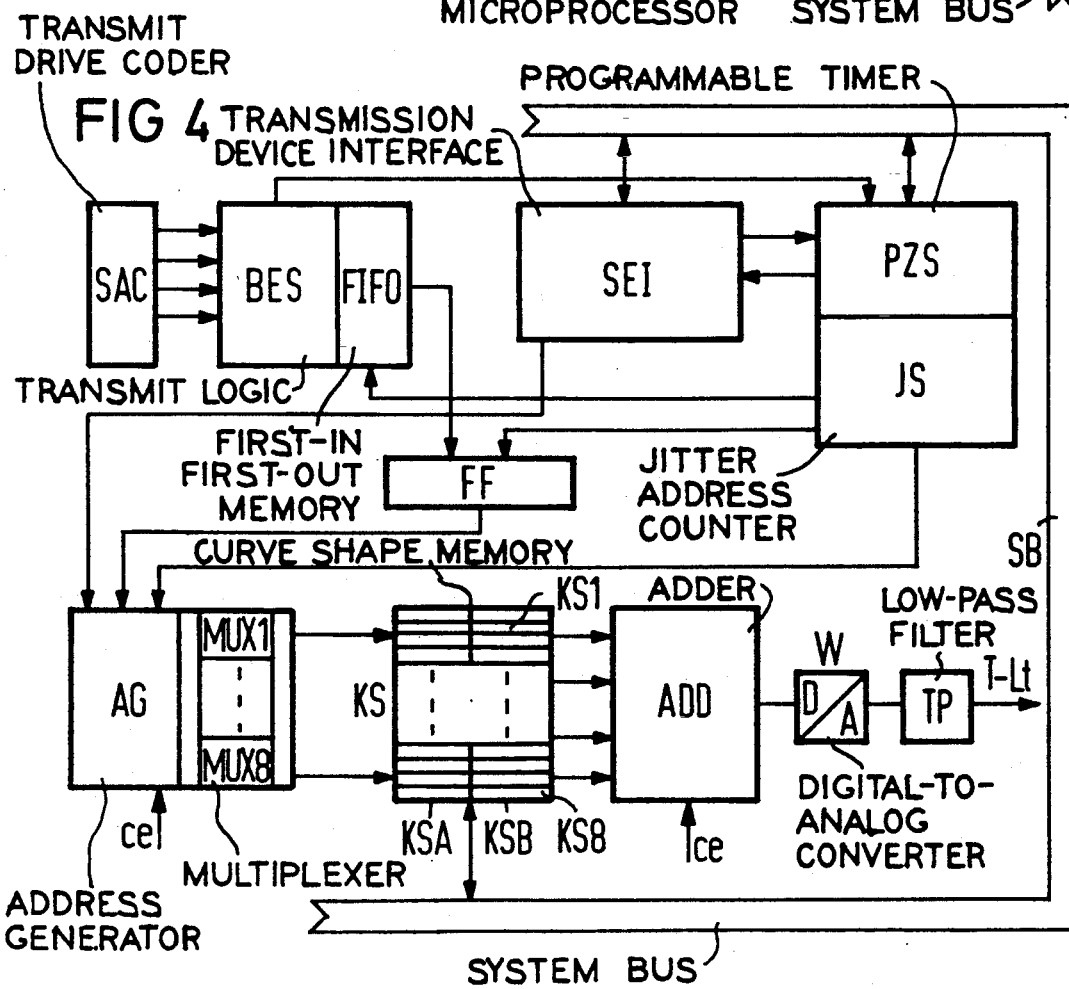
FIG. 4 is a schematic block circuit diagram of the critical components of the transmission device of FIG. 1.

The transmitter device shown in FIG. 4 is controlled by the output signals of the transmitting drive coder SAC. When testing a U200 interface, for example, a pause that lasts longer than 100 ms is recognized on the control line of the transmission/receiving control module STID (FIG. 2) connected to the transmitting drive coder SAC, that a burst start pulse is generated at the appearance of the first pulse on this line (synchronous pulse that always exists). When a burst reception and transmitting logic BES receives this pulse, its memory FIFO that serves the purpose of intermediate storage of the bits of a burst is empty. The states of the two other control lines are transferred into the memory FIFO with the clock communicated from the transmitting drive coder SAC. The timing for the transfer of transmission data into the transmitting device is, therefore, always defined by the receiving device and, therefore, by the actual clock weight and clock phase on the third control line.

A programmable timer PZS (not shown in detail) contains a jitter address JS realized by a direct memory access (DMA) address generator, a jitter memory and a jitter counter. The jitter counter is clocked with the central working clock (4.96 MHz) and is respectively initialized from the jitter memory JS. When the jitter counter has counted down to zero, then the jitter address counter is incremented by one clock. The counter reading then serves as an address for the following jitter memory JS that defines the read-out clock for the burst from the memory FIFO of the burst receiving and transmitting logic BES. The jittered starting pulses are supplied from the jitter memory JS to an address generator AG that is likewise clocked with the working clock cl of 4.096 MHz. A total of eight address counters for eight bits each count from 0 through 128 in clock-suited fashion after receiving a starting pulse and then stop. When a start pulse is already received before the final reading is reached, then a restart at 0 is undertaken at this time.

By way of a multiplexer MUX, the address generator AG effects the read-out of data words within a curve shape memory KS. In order to be able to undertake faultless modifications of the curve shapes during the reading, all curve shapes are doubly stored, i.e. the curve shape memory KS comprises two memory banks KSA, KSB. The test method employed provides that up to eight individual pulses can chronologically superimpose. For this reason, all curve shapes are stored eight-fold in their respective own curve shape memory KS1-KS8. In order to be able to generate a fine jitter than can deviate from the fixed times prescribed by the transmission clock by smaller shifts of pulses than prescribed by the jitter counter of the programmable time PZS, respectively, four curves identical to one another are stored in each curve shape memory KS1-KS8. These four identical curves being respectively shifted by $1/(4 \times 4.096$ MHz$)=61$ ns relative to one another. An even farther-reaching subdivision of the memory areas within the curve shape memories KS1-KS8 is established in that curve shapes are stored both for a positive pulse, a negative pulse and as two zero pulses.

Accordingly, respectively eight data words read from the curve shape memories KS1-KS8 are added 128 times during the transmission of the pulse, the data words being added in an adder ADD following the curve shape memory KS and clocked by the working clock cl. The sum deriving therefrom is output onto the subscriber line T-Lt via a digital-to-analog converter W and a following low-pass filter TP.

The overall transmission device must be capable of being controlled by the central microcomputer (PC in FIG. This purpose is served by a transmission device interface SEI, with whose assistance functions such as the programming of the jitter address counter, filling the curve shape memory KS1-KS8 and switching between the two curve shape memory banks KSA, KSE can be carried out.

Although we have described our invention by reference to particular illustrated embodiments thereof, many changes and modifications of the invention may become apparent to those skilled in the art without departing from the spirit and scope of the invention. We, therefore, intend to include within the patent warranted hereon all such changes and modifications as may reasonably and properly be included within the scope of our contribution to the art.

We claim:

1. A test arrangement for testing the transmission characteristics of a plurality of units to be tested each including a subscriber line module which has a line interface unit or a digital terminal which has a digital terminal interface unit of a communication system connectible thereto, comprising:

selection control means for selecting an initial condition for a unit under test and initializing the unit under test to the initial condition, said selection control means connecting an individual one of said subscriber line modules and said digital terminal interface units to said test arrangement;

a transmitting device for generating test pulses representing bits combined into bursts, said transmitting device including memory means storing characteristic curve shapes and jitter data for simulating specific cable types and lengths, reading means for reading said data from said memory means and digital-to-analog conversion means for converting the read data into test pulses for transmission to a selected unit under test;

receiving means connected to said transmitting device via the selected unit under test, said receiving means receiving the test pulses transmitted by said transmitting device to the selected unit under test and re-transmitted by said selected unit under test in forming a test loop, said receiving means being capable of being set to receiving characteristics of a subscriber line module when testing a digital terminal and of a digital terminal interface unit when testing a subscriber line module;

an evaluation device for comparing the test pulses transmitted by said transmitting device to the test pulses received by the receiving means;

a system bus; and coupling means for coupling said transmitting device and said receiving means to an interface unit of a selected unit under test, a central microcomputer connected to said system bus and programmed to coordinate the operation of said transmitting device, said receiving means, said evaluation device and said selection control means.

2. The test arrangement of claim 1, and further comprising:

sampling means connected to said line interface unit of the selected unit under test for acquiring and sampling the test pulses re-transmitted by the selected test unit, said sampling means connected to said system bus and including a sample memory for storing sampled test pulse values of at least one burst.

3. The test arrangement of claim 1, wherein:

said receiving means comprises a microprocessor including an associated memory for communication with said central microcomputer for controlling receiving characteristics of said receiving means.

4. The test arrangement of claim 3, wherein:

said associated memory is connected to said system bus for receiving the test pulses transmitted by said transmitting device; and said microprocessor represent said evaluation device for comparing the test pulses stored in the associated memory to the test pulses received by said receiving means.

5. The test arrangement of claim 3, and further comprising:

a terminal interface means in said receiving means including a PCM-in highway and PCM-out highway for carrying data to and from said terminal interface means;

a microprocessor bus connected to receive the data from said terminal interface means and to transmit the data to said terminal interface means;

a peripheral board processor connected to said PCM-in highway and to said PCM-out highway between said terminal interface means and said microprocessor bus; and an HDLC line connecting said peripheral board processor to said microprocessor bus.

6. The test arrangement of claim 5, and further comprising:

output lines comprised in said terminal interface means; and a transmitter drive coder connected to said output lines for driving said transmitting device, a first of said output lines carrying subscriber line-synchronous clock pulses, and a second of said output lines carrying control signals.

7. The test arrangement of claim 6, and further comprising:

a bidirectional interface for bi-directional transmission of transmission and reception data; and subscriber interface means in said receiving means connected to said peripheral board processor via said bidirectional interface for receiving and transmitting the transmission and reception data.

8. The test arrangement of claim 7, and further comprising:

output lines of said subscriber interface means as inputs to said transmitter drive coder for carrying clock and control signals.

9. The test arrangement of claim 3, wherein:

said receiving means comprises in addition to said microprocessor, a microprocessor bus connected to said microprocessor, an integrated services digital network receiving module that can be operated as an interface means for subscriber line modules and for digital terminals, and integrated services communication controller connected to said integrated services digital network receiving module and including an interface for B-channels and a D-channel connected to said microprocessor bus.

10. The test arrangement of claim 9, wherein:

said integrated services digital network receiving module comprises a clock output and a control pulse output connected to a transmitter drive coder.

11. The test arrangement of claim 10, wherein:

said transmitter drive coder comprises four outputs for providing four different drive signals for driving said transmitting device, first and second ones of said drive signals prescribing the transmission of a positive or negative drive pulse, respectively, a third of said drive signals being a line data clock for timing the determination of the polarity of the drive pulse to be transmitted, and a fourth of said drive signals being starting pulses marking the beginnings of bursts.

12. The test arrangement of claim 11, wherein:

said memory means comprises a write-read memory as a jitter memory storing pluralities of numerical values that determine a read-out clock jitter for the individual bits of a burst in terms of jitter frequency, jitter deviation and jitter characteristic as jitter identification data.

13. The test arrangement of claim 12, and further comprising:

a jitter counter that operates at a frequency at least ten times higher than the bit clocked frequency of the burst, said jitter counter connected to and initialized by said jitter memory.

14. The test arrangement of claim 12, wherein:

said transmitting device comprises a plurality of curve shape memories corresponding in number to a predetermined maximum plurality of chronologically-overlapping pulses, a respective curve shape being represented by a predetermined plurality of data words stored in said curve shape memories.

15. The test arrangement of claim 14, wherein:

each of said curve shape memories comprises at least three memory areas in which the curve shape of a positive pulse, of a negative pulse, and of zero pulse are stored.

16. The test arrangement of claim 15, wherein:

a plurality n of curve shapes that are chronologically offset relative to one another by $1/n \times a$, wherein a is the frequency of the read-out clock, are stored in each curve shape memory.

17. The test arrangement of claim 16, and further comprising:

a respective memory address generator including address counters individually assigned and connected to each of said curve shape memories.

18. The test arrangement of claim 17, and further comprising:

an adder in said reading means including a plurality of inputs connected in parallel to said curve shape memories and an output connected to said digital-to-analog conversion means.

* * * * *